United States Patent
Lee et al.

(10) Patent No.: US 10,077,158 B2
(45) Date of Patent: Sep. 18, 2018

(54) CARGO TRANSPORT SYSTEM INCLUDING MOTORIZED PALLET

(71) Applicant: Toyota Motor Engineering & Manufacturing North America, Inc., Erlanger, KY (US)

(72) Inventors: Gary Lee, Kitchener (CA); Darren Eric Valad, Kitchener (CA); Tony V. Cortina, Paris (CA); Cristian Ignat, Burlington (CA); Raymond David Givens, Denfield (CA); Christopher William Garland, Dorchester (CA)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

(21) Appl. No.: 15/403,579

(22) Filed: Jan. 11, 2017

(65) Prior Publication Data
US 2018/0194576 A1     Jul. 12, 2018

(51) Int. Cl.
*B65G 67/20* (2006.01)
*B60P 1/52* (2006.01)
*B60P 1/64* (2006.01)

(52) U.S. Cl.
CPC ............ *B65G 67/20* (2013.01); *B60P 1/52* (2013.01); *B60P 1/6409* (2013.01); *B60P 1/6436* (2013.01)

(58) Field of Classification Search
CPC ....... B62D 63/064; B62D 63/08; B60P 1/025; B60P 1/02; B60P 1/6436; B60P 1/6409; B62B 2203/74; B65D 19/42; B65G 69/24; B65G 1/065

USPC ........... 414/788.3, 277, 286, 352, 339, 498; 280/47.19, 79.11
See application file for complete search history.

(56) References Cited

U.S. PATENT DOCUMENTS

| | | | | |
|---|---|---|---|---|
| 5,403,143 A * | 4/1995 | Ito | ............................. | B60P 1/00 414/352 |
| 6,866,463 B2 * | 3/2005 | Riordan | .................... | B62B 3/04 280/79.3 |
| 7,806,646 B2 * | 10/2010 | Riordan | .................... | B62B 3/04 180/14.1 |

(Continued)

FOREIGN PATENT DOCUMENTS

| | | |
|---|---|---|
| DE | 20307005 U1 | 8/2003 |
| EP | 2765101 A1 | 8/2014 |

*Primary Examiner* — Kaitlin S Joerger
(74) *Attorney, Agent, or Firm* — Christopher G. Darrow; Darrow Mustafa PC

(57) ABSTRACT

A cargo transport system includes a cassette for transporting a workpiece and dolly for transporting the cassette. The dolly includes a dolly frame and at least one wheel attached to the dolly frame for supporting the dolly on a surface. A track plate is attached to the dolly frame. The cassette is moveably mountable on the dolly and includes a cassette frame having first and second cassette conveyors engagable with the dolly for moveably supporting the cassette on the dolly. A first drive wheel is attached to the cassette frame between the first and second cassette conveyors. The first drive wheel is rotatable about a first axis of rotation and is operable for moving the cassette along a path-of-travel relative to the dolly. A location of the first axis of rotation is continuously adjustable relative to the cassette frame as the cassette moves along the path-of-travel.

20 Claims, 11 Drawing Sheets

(56) References Cited

U.S. PATENT DOCUMENTS

| | | | | |
|---|---|---|---|---|
| 8,235,642 | B2* | 8/2012 | Camaly | B62D 63/08 |
| | | | | 414/339 |
| 8,302,975 | B2* | 11/2012 | Hergeth | B62B 3/04 |
| | | | | 280/47.19 |
| 9,211,900 | B2* | 12/2015 | Knepp | B62B 3/08 |
| 9,290,214 | B2* | 3/2016 | Badura | B62D 53/00 |
| 9,676,314 | B2* | 6/2017 | Neubauer | B60P 1/02 |
| 9,738,465 | B2* | 8/2017 | Berghammer | B60P 1/02 |
| 9,862,435 | B2* | 1/2018 | Scarth | B62D 53/04 |
| 2009/0229488 | A1 | 9/2009 | Ward | |
| 2014/0366783 | A1* | 12/2014 | Kosonen | B65D 19/0002 |
| | | | | 108/51.11 |
| 2015/0251583 | A1* | 9/2015 | Ziemann | B62D 53/005 |
| | | | | 414/495 |
| 2016/0288687 | A1* | 10/2016 | Scherle | B66F 9/063 |
| 2017/0021754 | A1* | 1/2017 | Berghammer | B60P 1/43 |

\* cited by examiner

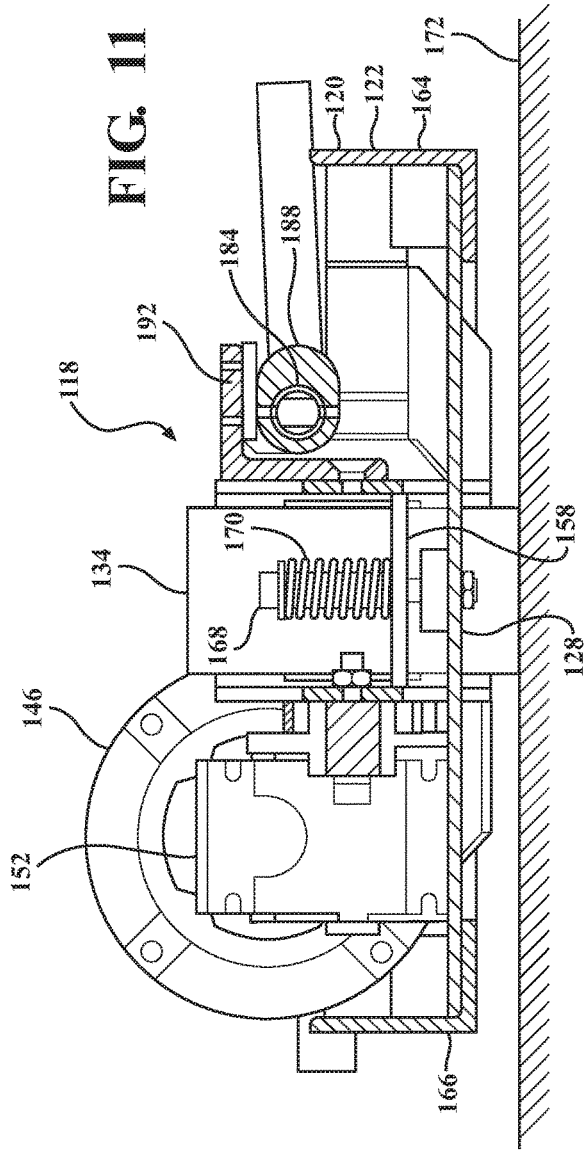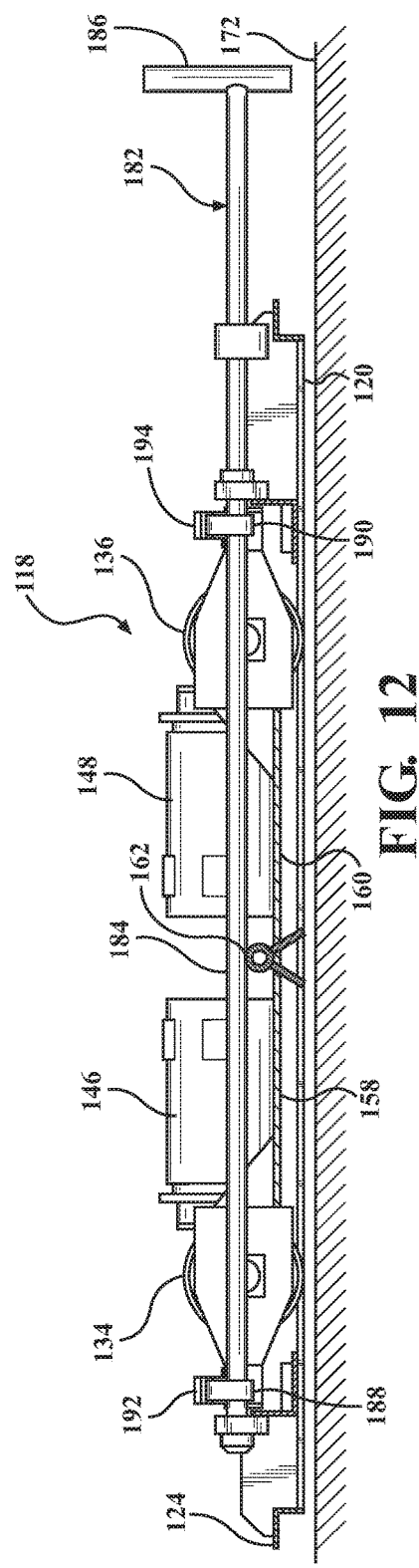

CARGO TRANSPORT SYSTEM INCLUDING MOTORIZED PALLET

BACKGROUND

Manufacturing facilities, such as automobile assembly plants, use dollies to move pallets loaded with large workpieces, such as vehicle body panels, throughout the facility. The dolly may be transported between locations within the facility by a tow vehicle attached to the dolly. The dolly can be used to transport the pallet loaded with workpieces to a conveyor system, which itself transports the workpieces to various workstations throughout the facility. To load the workpieces onto the conveyor system the tow vehicle can position the dolly and the pallet loaded with workpieces adjacent the conveyor system. An operator may then manually push the pallet with the workpieces off the dolly and onto the conveyor system. If the pallet and workpieces are particularly heavy, the dolly may include various mechanisms to facilitate loading and unloading of the pallet onto and off of the dolly, such as powered roller beds. The conveyor system may also employ a powered roller bed to assist with moving the cassette from the dolly to the conveyor system. These systems may be complex and expensive to implement, and costly and time consuming to maintain.

SUMMARY

Disclosed is cargo transport system that includes a self-propelled motorized cassette. The cargo transport system may include a dolly for transporting the self-propelled cassette between various locations within a manufacturing facility. The cassette may include an integrated drive system operable for loading and unloading the cassette onto and off of the dolly. A tow vehicle may be attached to the dolly to assist with moving the dolly between locations.

The dolly may include one or more spaced apart conveyors to assist with loading and unloading the cassette onto and off of the dolly. The conveyors may include a first conveyor located adjacent a front end of the dolly and a second conveyor located adjacent a rear end of the dolly. The first and second conveyors provide a support surface that minimizes sliding resistance between the cassette and the dolly to facilitate sliding the cassette onto and off of the dolly.

The dolly may include a pair of elongated guide rails arranged adjacent the conveyors that assist with guiding the cassette on and off of the dolly. The guide rails may include a generally flat surface along which the cassette may slide when being loaded and unloaded from the dolly. The guide rails may be spaced apart from one another by a distance greater than a width of the cassette. The cassette may be positioned between the guide rails when loaded on the dolly.

The cassette may include a generally rectangular-shaped base frame that can be supported horizontally on the dolly. The base frame may include a first conveyor rail and a second conveyor rail spaced from first conveyor rail. The first and second conveyor rails engage the dolly conveyors when the cassette is loaded on the dolly.

The cassette may include a powered drivetrain for moving the cassette along a generally linear path-of-travel relative to the dolly. The drivetrain may include a first drive wheel and a second drive wheel, which together operate to propel the cassette along the path-of-travel. The first and second drive wheels may each be driven by a separate motor. Each motor and drive wheel combination may be mounted on a separate pivot arm pivotally connected to a drivetrain frame. Each pivot arm may be pivotally connected to a common pivot shaft. An end of the pivot arms opposite the pivot shaft may be moveably connected to a cross-member on the drivetrain frame. A biasing member may be provided for urging the ends of the pivot arms into contact with the cross-members.

The drive wheels may engage a traction surface on the dolly. The traction surface provides a surface for the drive wheels to move along when the drivetrain is operated to propel the cassette along the path-of-travel. Pivotally connecting the drive wheels to the drivetrain frame enables the drivetrain to continuously adjust a location of the drive wheels relative to the base frame of the cassette to maintain contact between the drive wheels and the traction surface when the cassette traverses an uneven surface. The biasing member provides a continuous biasing force that urges the drive wheels into contact with the traction surface.

BRIEF DESCRIPTION OF THE DRAWINGS

The various features, advantages and other uses of the present apparatus will become more apparent by referring to the following detailed description and drawings, in which:

FIG. 11 is a partial cross-sectional view of the drivetrain taken along section line 11-11 of FIG. 8, with the first drive wheel arranged in a traction position;

FIG. 12 is a partial cross-sectional view of the drivetrain taken along section line 12-12 of FIG. 8, with the pair of drive wheels arranged in a retracted position;

DETAILED DESCRIPTION

Figure 1:
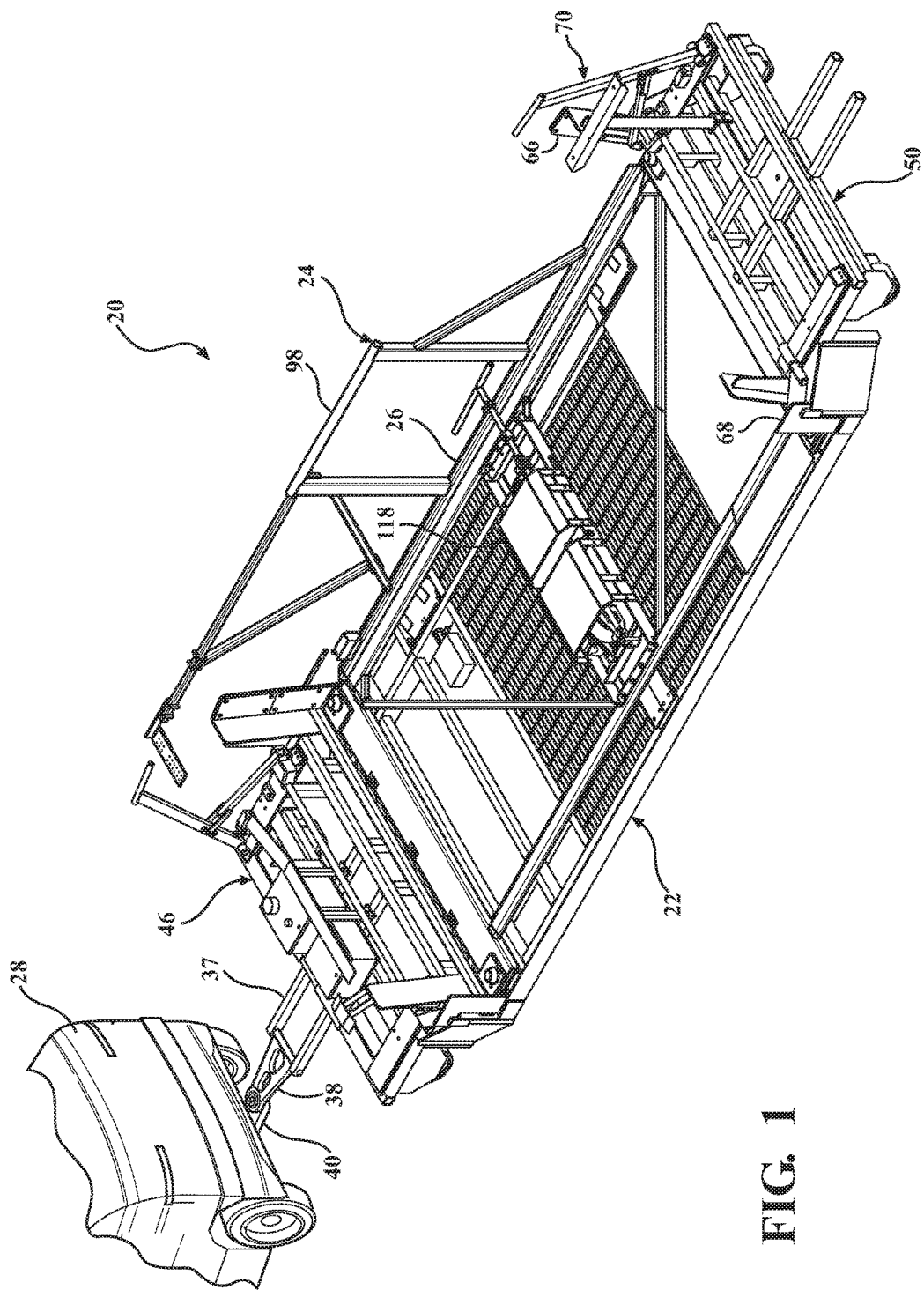
FIG. 1 is perspective view of a cargo transport system including a self-propelled cassette for carrying cargo and a dolly for transporting the cassette.

A cargo transport system that includes a self-propelled motorized cassette is disclosed. The cargo transport system includes a cassette for transporting a workpiece and dolly for transporting the cassette. The cassette includes a unique drivetrain that enables the cassette to traverse uneven and discontinuous surfaces without losing traction. The drivetrain may include a pair of co-aligned drive wheels that operate to propel the cassette along a path-of-travel relative to the dolly. The drive wheels may each be mounted on a separate pivot arm pivotally connected to a drivetrain frame. Each pivot arm may be pivotally connected to a common pivot shaft. An end of the pivot arms opposite the pivot shaft may be moveably connected to a cross-member on the drivetrain frame. A biasing member may be provided for urging the drive wheels into contact with a traction surface. Pivotally connecting the drive wheels to the drivetrain frame enables the drivetrain to continuously adjust a location of the drive wheels relative to a base frame of the cassette to maintain contact between the drive wheels and the traction surface when the cassette traverses an uneven surface.

Referring now to the discussion that follows and also to the drawings, illustrative approaches to the disclosed systems and methods are described in detail. Although the drawings represent some possible approaches, the drawings are not necessarily to scale and certain features may be exaggerated, removed, or partially sectioned to better illustrate and explain the present invention. Further, the descriptions set forth herein are not intended to be exhaustive or otherwise limit or restrict the claims to the precise forms and configurations shown in the drawings and disclosed in the following detailed description.

With reference to FIG. 1, a cargo transport system 20 may be configured to transport a wide variety of cargo. For example, cargo transport system 20 may be configured to transport a workpiece for use in assembling a product in a manufacturing operation. In practice, cargo transport system 20 may be configured for use in various applications and for transporting different types of cargo.

Cargo transport system 20 may include a dolly 22 for transporting a self-propelled motorized cassette 24, which may also be referred to as a pallet. As used herein, the terms cassette and pallet may be used interchangeably and are not intended to designate differently configured devices. Cassette 24 may be suitably configured to accommodate the size, weight and configuration of the particular cargo being transported.

Dolly 22 may be used to transport cassette 24 (with or without cargo) between various locations within a manufacturing facility. Cassette 24 may include an integrated drive system 26 operable for loading and unloading cassette 24 onto and off of dolly 22. A tow vehicle 28 may be attached to dolly 22 to assist with moving dolly 22 (with or without cassette 24) between locations.

Figure 2:
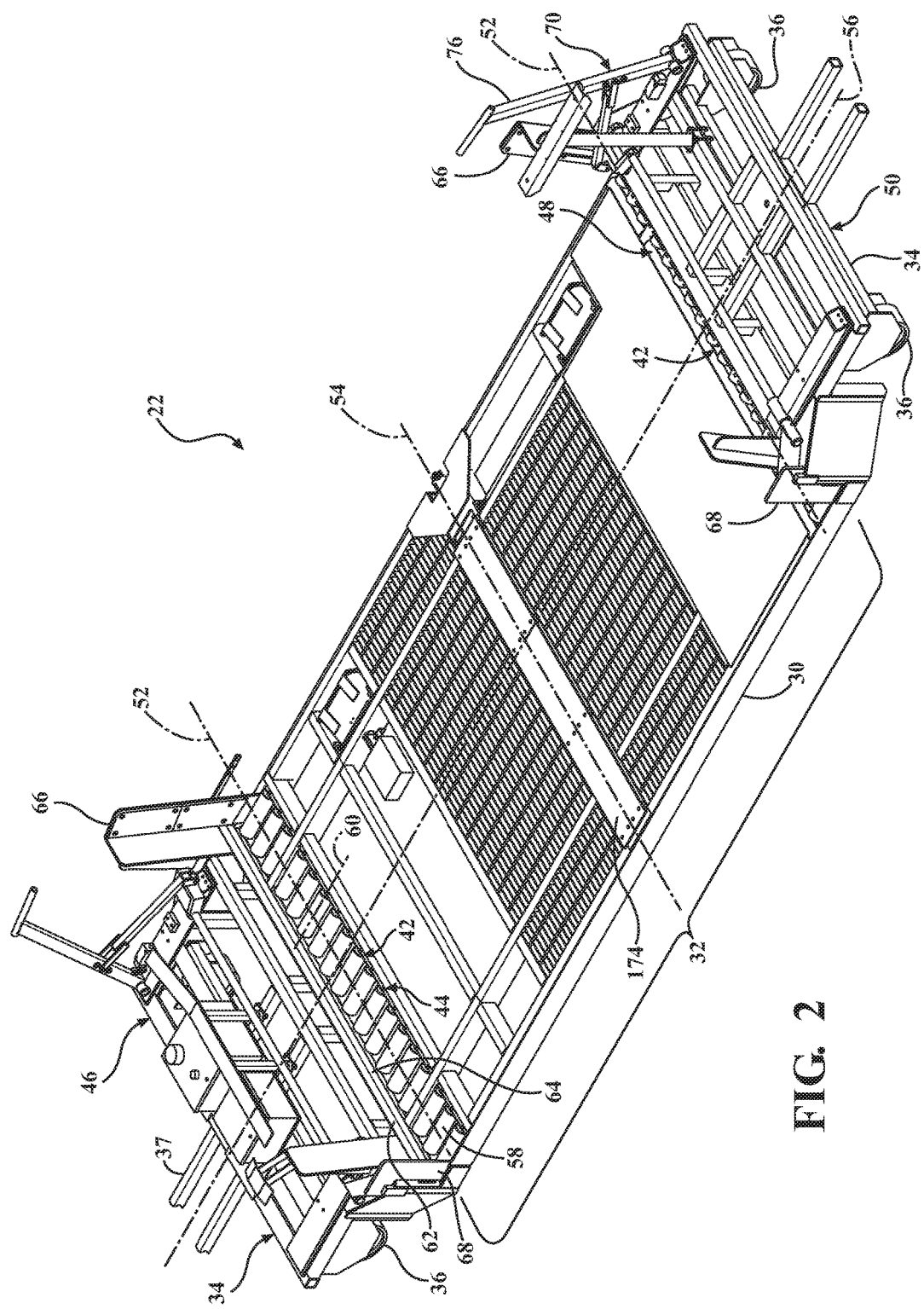
FIG. 2 is a perspective view of the dolly without the cassette.

With reference to FIG. 2, dolly 22 may include a frame 30 suitably configured to support cassette 24. Frame 30 may have any of various configurations and can be adapted to accommodate a particular size, shape and weight of cassette 24. Frame 30 may include a dolly platform 32 for supporting cassette 24 on dolly 22. Dolly platform 32 may be configured to accommodate a particular configuration of cassette 24, and may include a variety of shapes and sizes. Although illustrated in the drawing figures as having a generally rectangular shape, dolly platform 32 may also include other shapes.

Frame 30 may include a wheel carriage 34 attached to opposite ends of dolly platform 32. Each wheel carriage 34 may include wheels 36 that enable dolly 22 to be moved between locations. Each wheel 34 carriage may include a pair of wheels 36. Dolly platform 32 may be configured to sit lower to a ground surface on which the wheels 36 are resting than wheel carriages 34 to facilitate loading and unloading of cassette 24 onto and off of dolly 22.

With reference to FIG. 1, dolly 22 may be towed behind tow vehicle 28. A tow bar 37 may be attached to frame 30 and may include a connector 38 configured to attach to a hitch 40 on tow vehicle 28. Tow vehicle 28 may include various configurations and be capable of generating sufficient power to tow dolly 22 while transporting cassette 24 fully loaded with cargo.

Dolly 22 may be configured to enable cassette 24 to be loaded onto dolly 22 by sliding cassette 24 onto dolly platform 32 from a side of the dolly 22. Dolly 22 may alternatively be configured to enable cassette 24 to be loaded onto dolly 22 from either a front or rear of dolly 22.

Dolly 22 may include one or more spaced apart conveyors 42 to assist with loading and unloading cassette 24. Conveyors 42 may include a first conveyor 44 located adjacent a front end 46 of dolly 22 and a second conveyor 48 located adjacent a rear end 50 of dolly 22. First and second conveyors 44 and 48 enable cassette 24 to be slid onto dolly 22. A substantial portion of the weight of cassette 24, including any cargo, is supported by first and second conveyors 44 and 48 when loaded onto dolly 22. First and second conveyors 44 and 48 are not powered and do not provide any motive force for moving cassette 24 relative to dolly 22. First and second conveyors 44 and 48 provide a support surface that may minimize sliding resistance between cassette 24 and dolly platform 32 to facilitate sliding cassette 24 onto and off of dolly 22. The ability to slide cassette 24 onto dolly 22 eliminates the need for specialized equipment capable of lifting and placing a fully loaded cassette onto dolly 22.

Respective longitudinal axes 52 of first and second conveyors 44 and 48 may be arranged generally parallel to a path-of-travel 54 of cassette 24 when being loaded onto and off of dolly 22. In instances where cassette 24 is loaded onto dolly 22 from a side of dolly 22, which is the configuration illustrated in the drawing figures, path-of-travel 54 extends generally perpendicular to a longitudinal axis 56 of dolly 22, but may also have a different orientation depending on the particular application. In the illustrated example, first and second conveyors 44 and 48 are positioned at opposite ends of dolly platform 32, but additional conveyors 42 may also be employed.

First and second conveyors 44 and 48 may have any of various configurations to accommodate a particular configuration of cassette 24 and/or the requirements of a particular application. First and second conveyors 44 and 48 may be similarly or differently configured, and may include, for example, a series of spaced apart elongated rollers 58. Each roller 58 is generally free to rotate about its respective axis of rotation 60. The axes of rotation 60 for the set of rollers 58 may be are arranged on along a common plane generally coinciding with a plane of dolly platform 32 and oriented substantially perpendicular to longitudinal axes 52 of first and second conveyors 44 and 48. Rollers 58 may be arranged side-by-side along longitudinal axes 52 of first and second conveyors 44 and 48. First and second conveyors 44 and 48 may alternatively include other configurations that facilitate sliding cassette 24 on and off of dolly 22.

Dolly 22 may include a pair of elongated guide rails 62 that assist with guiding cassette 24 on and off of dolly 22. Guide rails 62 may include respective generally flat surfaces 64 along which cassette 24 may slide when being loaded and unloaded from dolly 22. A separate guide rail 62 may be located adjacent and extend generally parallel to each of the first and second conveyors 44 and 48. First and second conveyors 44 and 48 may be positioned between the guide rails 62 located adjacent the first and second conveyors 44 and 48. Respective longitudinal axes of guide rails 62 may be aligned generally parallel to path-of-travel 54 of cassette 24.

Guide rails 62 may be spaced apart from one another by a distance greater than a width of cassette 24. Cassette 24 may be positioned between guide rails 62 when loaded on dolly 22.

Dolly 22 may include one or more cassette stops 66 located adjacent an end of first and second conveyors 44 and 48 to help secure cassette 24 to dolly 22. Cassette stops 66 act as a guide to properly position cassette 24 on dolly 22 and to help prevent cassette 24 from sliding off an edge of dolly 22 when transporting cassette 24. Cassette stop 66 may be located along a side of dolly 22 opposite the side from which cassette 24 is loaded onto dolly 22. Each cassette stop 66 may be generally configured as an L-shaped channel extending upward from dolly platform 32. Each cassette stop 66 may alternatively include a different configuration and/or be located at another location on dolly 22.

Figure 3:
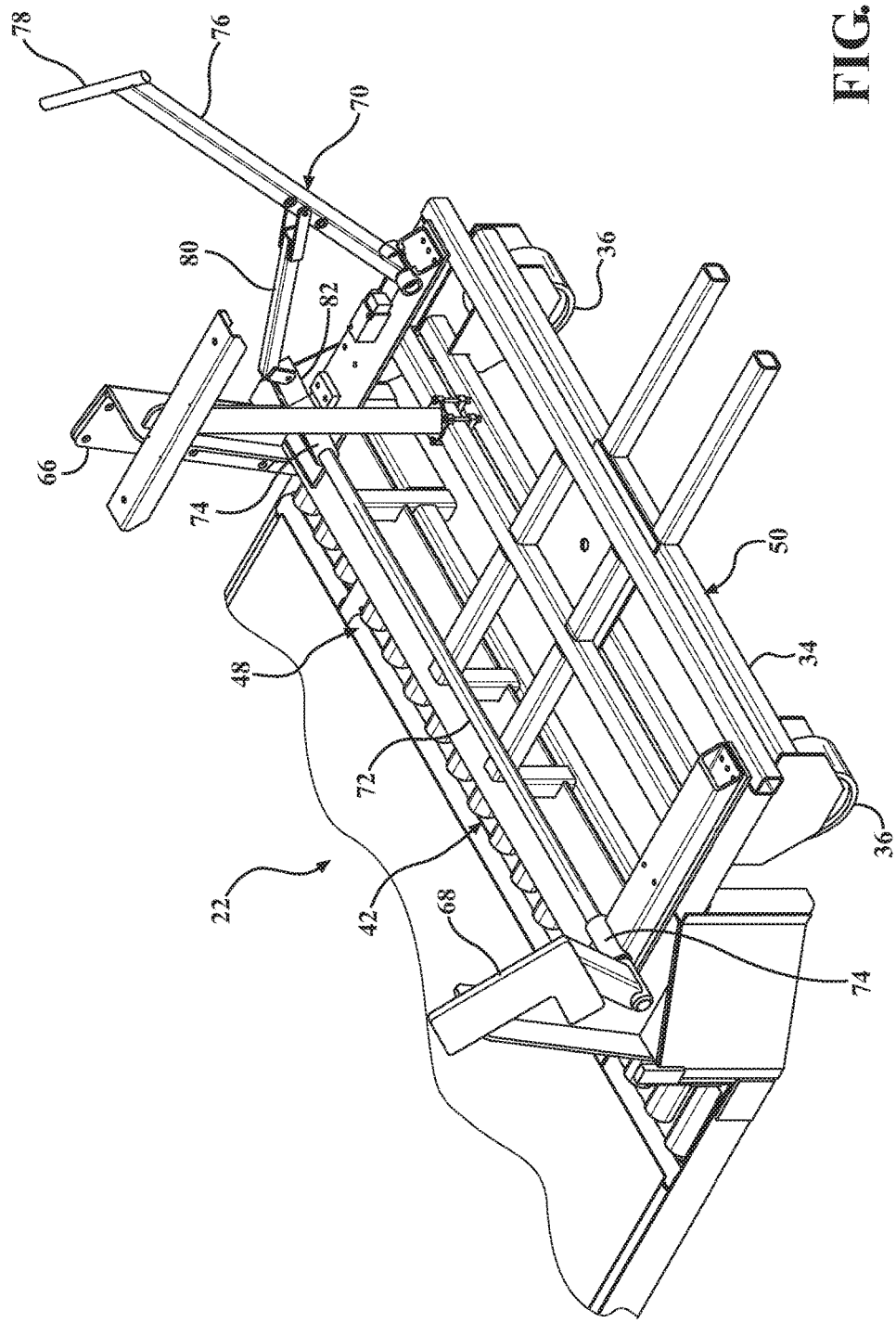
FIG. 3 is a close-up perspective view of the dolly showing a gate actuator for securing the cassette to the dolly, the gate actuator shown in an open position.
Figure 4:
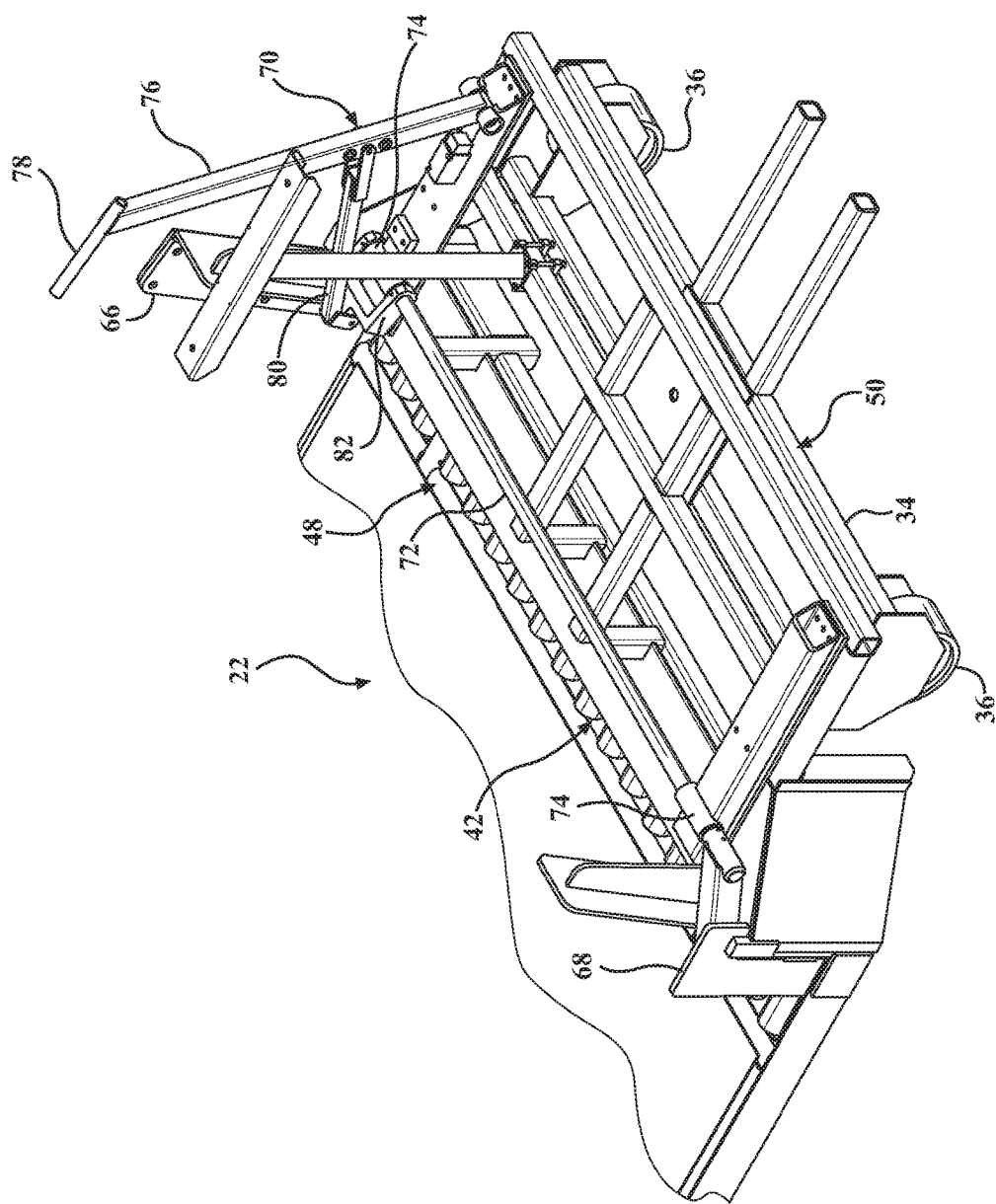
FIG. 4 is a close-up perspective view of the gate actuator shown in a closed position.

With reference to FIGS. 2-4, dolly 22 may include a moveable gate 68 for securing cassette 24 to dolly 22. Gate 68 may be moved between a closed position, as illustrated, for example, in FIGS. 2 and 4, and an open position, as illustrated, for example, in FIG. 3. When arranged in the closed position, gate 68 partially blocks path-of-travel 54 of cassette 24 to help secure cassette 24 on dolly 22 and prevent it from sliding off an edge of dolly 22 when being transported. Positioning gate 68 in the open position enables cassette 24 to move along path-of-travel 54 when loading cassette 24 onto and off of dolly 22.

Gate 68 may be attached to a gate actuator 70 that enables an operator to manually cycle gate 68 between the open and closed positions. Gate actuator 70 may include an elongated tie rod 72 rotatably connected to wheel carriage 34 of dolly 22 via bushings 74, bearings or similar devices. Tie rod 72 may extend laterally across a width of dolly 22. Gate 68 may be attached to an end of tie rod 72 and a hand lever 76 may be attached to an opposite end of tie rod 72.

Hand lever 76 may have one end pivotally attached to frame 30 of dolly 22. A handle 78 may be attached to an opposite end of the hand lever 76 to provide a convenient handhold for an operator when actuating gate actuator 70. A connecting rod 80 connects hand lever 76 to a lever arm 82 fixedly connected to an end of tie rod 72. One end of connecting rod 80 may be pivotally attached to hand lever 76 at a location between the end of the hand lever 76 attached to frame 30 of dolly 22 and handle 78. An opposite end of connecting rod 80 may be pivotally connected to lever arm 82.

An operator can move gate 68 to the open position (as shown, for example, in FIG. 3) from the closed position (as shown, for example, in FIGS. 2 and 4) by moving hand lever 76 away from dolly 22 (i.e., pivoting hand lever 76 clockwise when viewed from the perspective of FIG. 4). Conversely, gate 68 can be moved from the open position to the closed position by moving hand lever 76 toward dolly 22 (i.e., pivoting hand lever 76 counter-clockwise when viewed from the perspective of FIG. 4).

Figure 5:
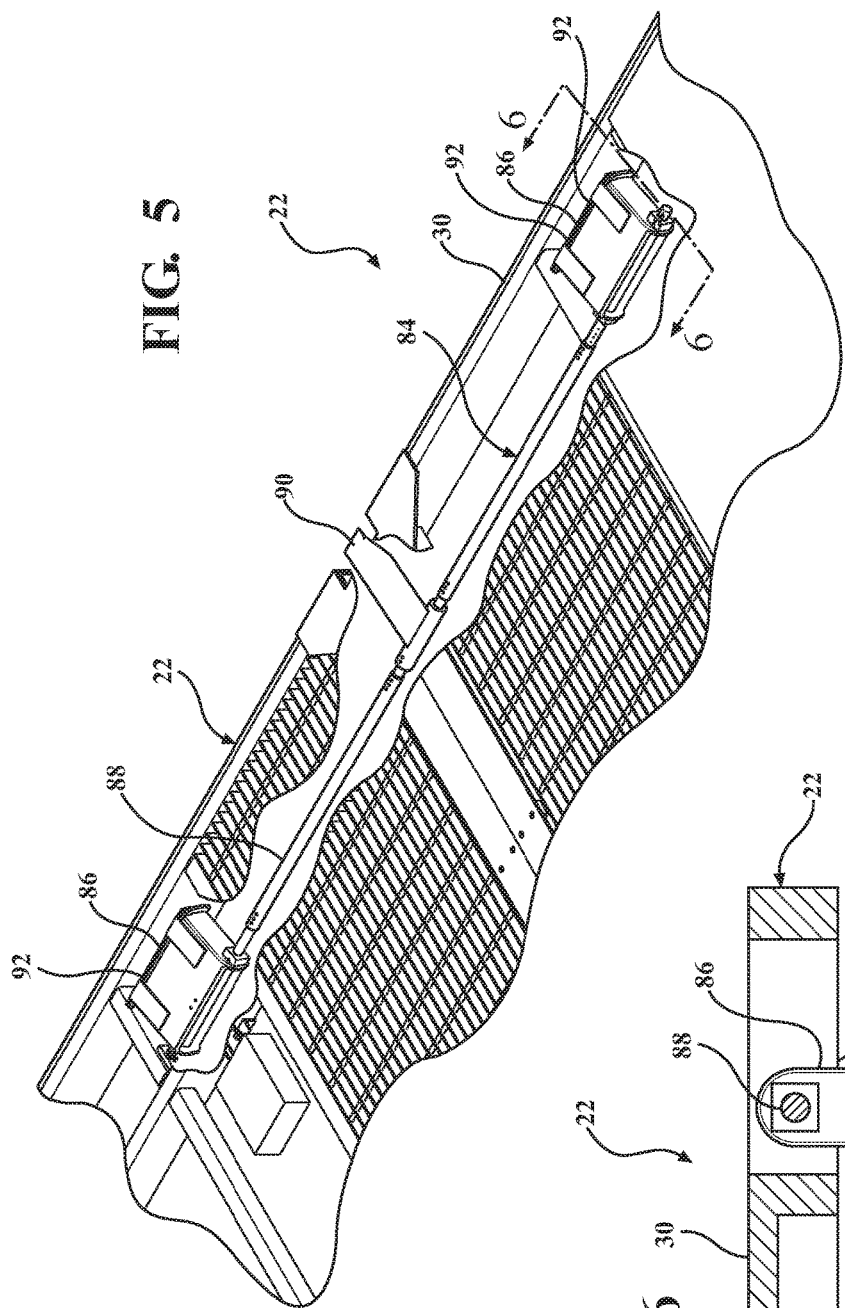
FIG. 5 is a close-up perspective view of a back stopper mechanism for resisting lateral movement of the dolly when unloading the cassette from the dolly.
Figure 6:
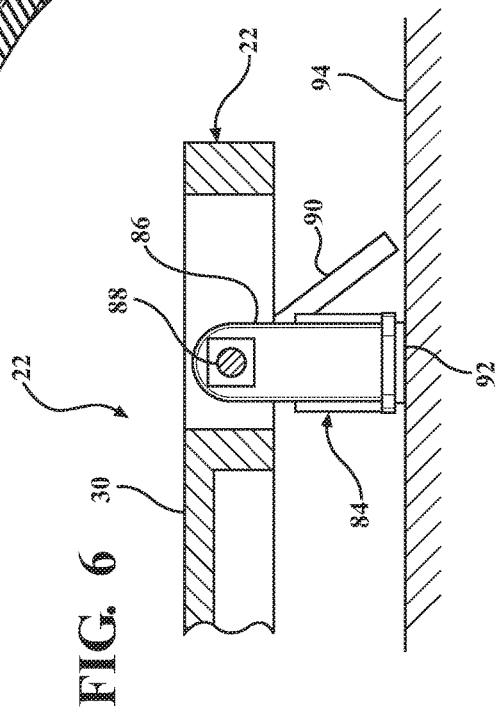
FIG. 6 is a partial cross-sectional view of a stopper block of the back stopper mechanism, shown arranged in a blocking position.

With reference to FIGS. 5 and 6, dolly 22 may include a back stopper mechanism 84, which when actuated, help prevents dolly 22 from being moved laterally (i.e., perpendicular to longitudinal axis 56 of dolly 22) when cassette 24 is being unloaded from dolly 22. Back stopper mechanism 84 may include a pair of spaced apart stopper blocks 86 pivotally connected to frame 30. Stopper blocks 86 may be interconnected to one another through a connecting shaft 88 that extends between the two stopper blocks 86. Back stopper mechanism 84 may be actuated by depressing a pedal 90 rigidly attached to connecting shaft 88. Actuating back stopper mechanism 84 from a travel position, as shown for example, in FIG. 5, to a blocking position, as shown for example, in FIG. 6, causes stopper blocks 86 to pivot downward. Respective ends 92 of stopper blocks 86 engage a ground surface 94 on which dolly 22 is resting when back stopper mechanism 84 is arranged in the blocking position, thereby hindering lateral movement of dolly 22. Ends 82 of stopper blocks 86 are disengaged from ground surface 94 when back stopper mechanism 84 is arranged in the travel position. Back stopper mechanism 84 is typically arranged in the travel position when transporting dolly 22.

Figure 7:
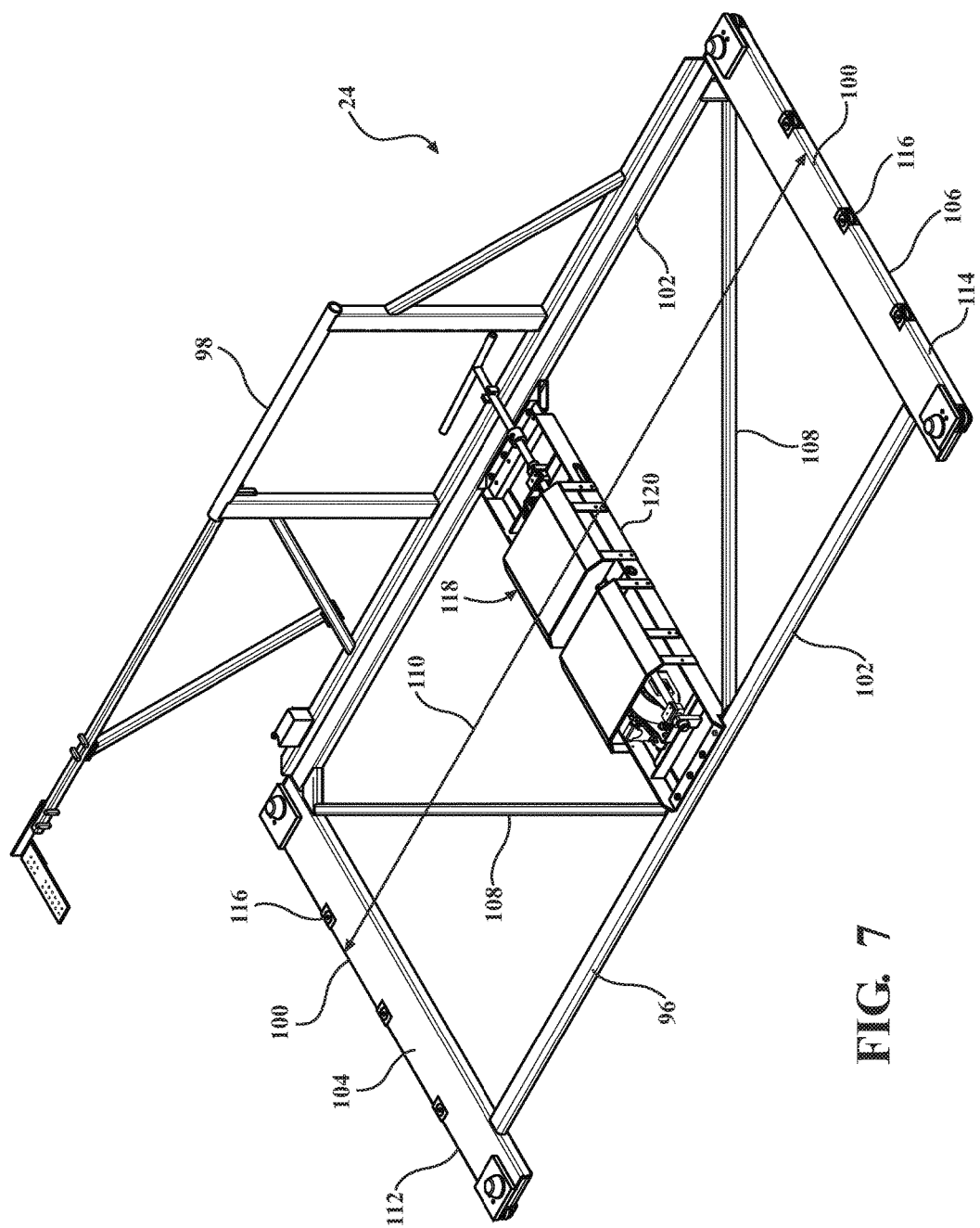
FIG. 7 is a perspective view of the cassette.
Figure 8:
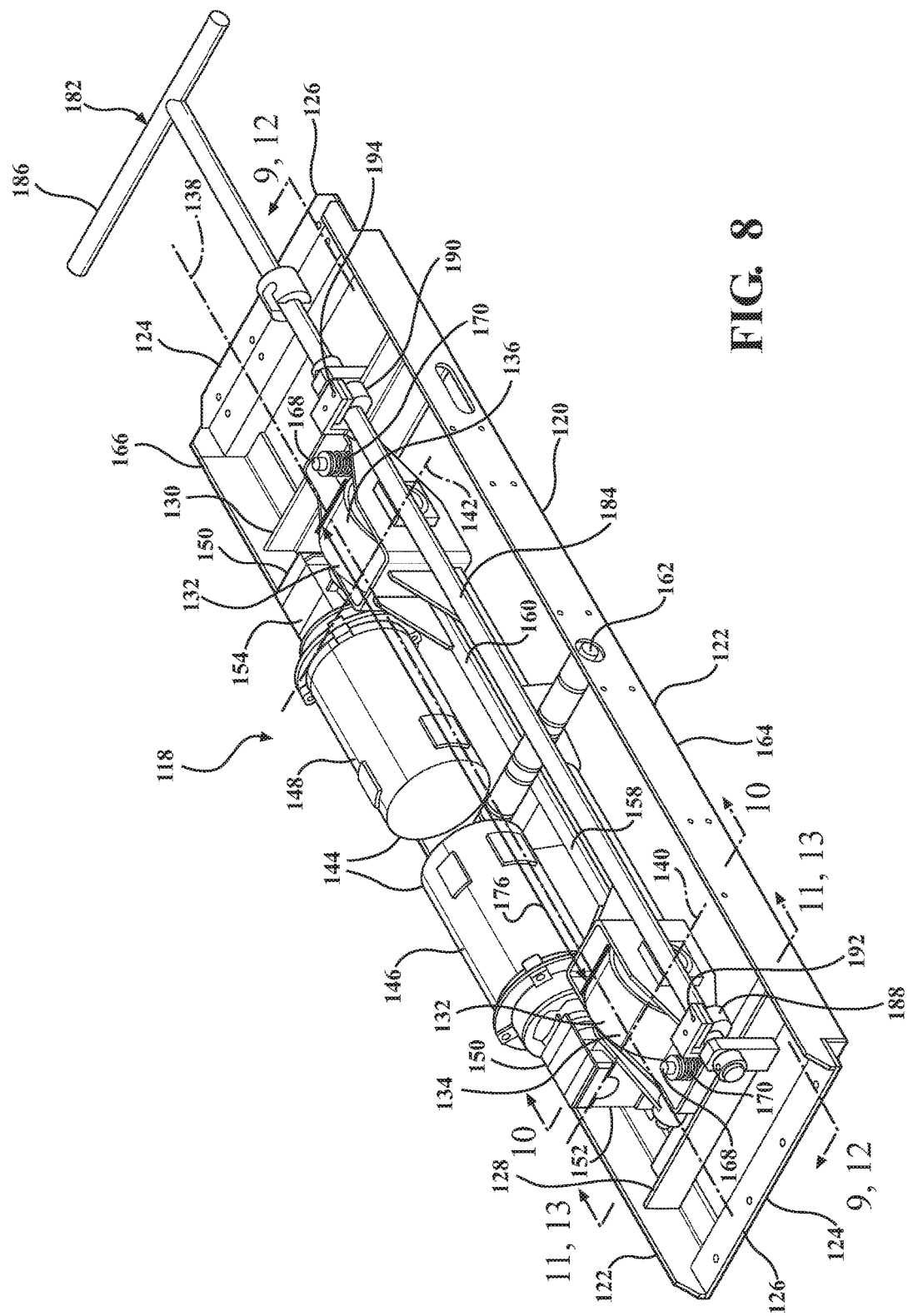
FIG. 8 is a perspective view of a cassette drivetrain for propelling the cassette.

With reference to FIG. 7, cassette 24 may include a generally rectangular-shaped base frame 96 that can be supported horizontally on dolly platform 32. Attached to base frame 96 is a cargo support 98 configured to support objects transported on cassette 24. The configuration of the cargo support 98 may be varied to accommodate a particular configuration of objects carried on cassette 24.

Base frame 96 may include a pair of elongated cassette conveyor rails 100 interconnected by a pair of frame rails 102 to form the generally rectangular-shaped base frame 96. Cassette conveyor rails 100 may include a first conveyor rail 104 and a second conveyor rail 106 spaced from first conveyor rail 104. First and second conveyor rails 104 and 106 may be oriented generally parallel to one another. Frame rails 102 extend between first and second conveyor rails 104 and 106, with one end attached to first conveyor rail 104 and an opposite end connected to second conveyor rail 106. Base frame 96 may include one or more stringers 108 extending at an oblique angle between cassette conveyor rails 100 and the frame rails 102 to help stiffen the base frame 96.

First and second conveyor rails 104 and 106 may be spaced from one another to enable cassette 24 to fit between guide rails 62 on dolly 22 when cassette 24 is loaded on the dolly 22. A distance 110 from an outer edge 112 of first conveyor rail 104 to an outer edge 114 of second conveyor rail 106 may be less than a distance between surfaces 64 of guide rails 62 on dolly 22. First and second conveyor rails 104 and 106 rest on rollers 58 of first and second conveyors 44 and 48, respectively, when cassette 24 is loaded on dolly 22.

Cassette 24 may include one or more rollers 116 positioned along outer edges 112 and 114 of first and second conveyor rails 104 and 106. Rollers 116 may roll along guide rails 62 on dolly 22 to help guide cassette 24 on and off of dolly 22.

With reference to FIGS. 7-10, cassette 24 may be self-propelled and include a powered drivetrain 118 for moving cassette 24 along the generally linear path-of-travel 54 (see, for example, FIG. 2). Drivetrain 118 may include a generally rectangular-shaped drivetrain frame 120 that extends between and is connected to frame rails 102 of base frame 96. Alternatively, or additionally, drivetrain frame 120 may be attached to other sections of base frame 96, such as cassette conveyor rails 100 and stringers 108.

Drivetrain frame 120 may include a pair of side rails 122 that extend generally perpendicular to frame rails 102 of cassette 24. The two side rails 122 may be interconnected by a pair of end rails 124 connected to the ends of side rails 122. End rails 124 may include a flange 126 for attaching drivetrain frame 120 to the frame rails 102 of base frame 96. Drivetrain frame 120 may include various additional support members, such as cross-members 128 and 130.

Drivetrain 118 may include a pair of drive wheels 132, which may include a first drive wheel 134 and a second drive wheel 136, that together operate to propel cassette 24 along its path-of-travel 54. An axis of rotation 140 of first drive wheel 134 and an axis of rotation 142 of second drive wheel 136 may be oriented perpendicular to path-of-travel 54. First and second drive wheels 134 and 136 may be co-aligned along a common plane oriented perpendicular to drive wheels 134 and 136 axes of rotation 140 and 142 and which extends along an axis 138 oriented generally parallel to path-of-travel 54. Axis 138 bisects first and second drive wheels 134 and 136 and may be substantially centered between first and second conveyor rails 104 and 106. Alternatively, more than two drive wheels 132 may be employed. It is not necessary that each of the drive wheels 132 be aligned along a common axis when more than two drive wheels 132 are employed. When two drive wheels 132 are employed, aligning the two drive wheels 132 along a common axis may help minimize yawing of the cassette that may occur if the drive wheels 132 are offset from one another.

First and second drive wheels 134 and 136 may each be driven by a separate motor 144. For example, a first motor 146 may rotatably drive first drive wheel 134 and a second motor 148 may rotatably drive second drive wheel 136. First and second motors 146 and 148 may be configured to utilize various power sources, including, but not limited to, electrical, pneumatic and hydraulic. In the illustrated example, first and second motors 146 and 148 are electrically powered. Electrical power for powering first and second motors 146 and 148 may be received from an onboard power source, such as a battery, or an external power source, such as a community electrical system.

A gearbox 150 may be used to connect first and second motors 146 and 148 to their respective first and second drive wheels 134 and 136. For example, a first gearbox 152 may connect first motor 146 to first drive wheel 134 and a second gearbox 154 may connect second motor 148 to second drive wheel 136. Respective output shafts of first and second motors 146 and 148 may be connected to an input of the respective first and second gearboxes 152 and 154, and respective output shafts 156 of first and second gearboxes 152 and 154 may be connected to the respective first and second drive wheels 134 and 136. Alternatively, the output shaft of first and second motors 146 and 148 may be directly connected to the respective first and second drive wheels 134 and 136.

Each motor 144, gearbox 150 and drive wheel 132 combination may be mounted on a separate pivot arm pivotally connected to drivetrain frame 120. For example, first motor 146, first gearbox 152 and first drive wheel 134 may be connected to a first pivot arm 158. Likewise, second motor 148, second gearbox 154 and second drive wheel 136 may be connected to a second pivot arm 160. First and second pivot arms 158 and 160 may be pivotally connected to a common pivot shaft 162. Side rails 122 of drivetrain frame 120 may include a first side rail 164 and a second side rail 166. One end of pivot shaft 162 may be connected to first side rail 164 and an opposite end may be connected to second side rail 166. An end of first pivot arm 158 may be pivotally connected to pivot shaft 162 and an opposite end moveably connected to cross-member 128 that extends between first and second side rails 164 and 166. Likewise, an end of second pivot arm 160 may be pivotally connected to pivot shaft 162 and an opposite end moveably connected to cross-member 130 that extends between first and second side rails 164 and 166.

Respective fasteners 168 may be used to attach the ends of first and second pivot arms 158 and 160 to the respective cross-members 128 and 130. Respective biasing members 170 may be disposed between ends of fasteners 168 and first and second pivot arms 158 and 160. One end of biasing members 170 engages drivetrain frame 120 and an opposite end is connected to first and second drive wheels 134 and 136 through respective first and second pivot arms 158 and 160. Biasing members 170 provide a biasing force for urging the ends of first and second pivot arms 158 and 160 into contact with the respective cross-members 128 and 130. As viewed from the perspective of FIG. 9, biasing member 170 urges first pivot arm 158 to rotate counter-clockwise about pivot shaft 162, and biasing member 170 urges second pivot arm 160 to rotate clockwise about pivot shaft 162.

Figure 9:
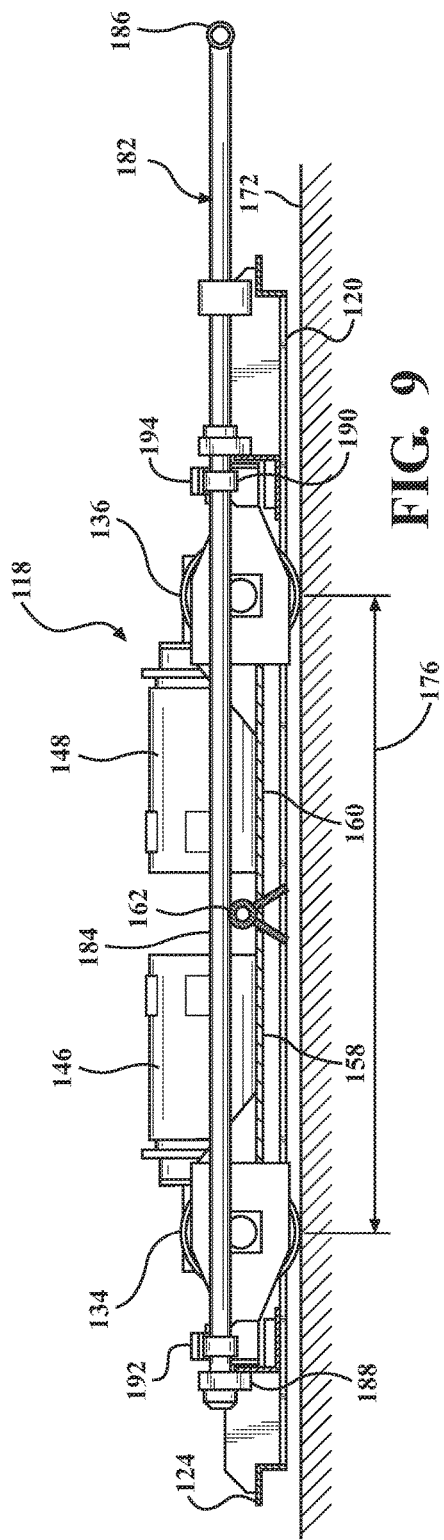
FIG. 9 is partial cross-sectional view of the drivetrain taken along section line 9-9 of FIG. 8, with a pair of drive wheels arranged in a traction position.
Figure 10:
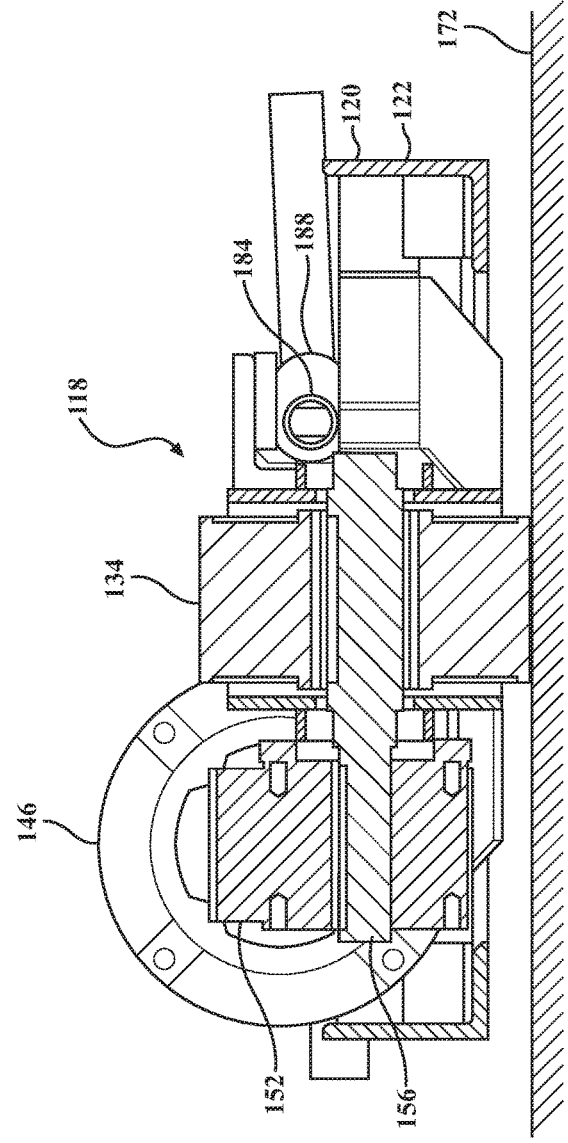
FIG. 10 is partial cross-sectional view of a first drive wheel taken along section line 10-10 of FIG. 8.

With reference to FIGS. 2, 9 and 11, first and second drive wheels 134 and 136 may engage a traction surface 172, such as track plate 174 on dolly platform 32 (see, for example, FIG. 2). Track plate 174 may extend laterally across dolly 22 along path-of-travel 54. Track plate 174 provides a surface for first and second drive wheels 134 and 136 to move along when drivetrain 118 is operated to propel cassette 24 along path-of-travel 54. A tractive force occurring between first and second drive wheels 134 and 136, and track plate 174 (i.e., traction surface 172) may be controlled by adjusting the biasing force generated by biasing member 170. The biasing force may be large enough to provide sufficient tractive force to enable first and second drive wheels 134 and 136 to propel cassette 24 along track plate 174 without slipping or loosing traction. A sum total of the biasing forces generated by biasing members 170 associated with first and second drive wheels 134 and 136 should be less than a total weight of cassette 24 and any cargo loaded on the cassette 24. The weight of cassette 24 and its cargo is distributed between first and second drive wheels 134 and 136 supported on track plate 174 and first and second conveyor rails 104 and 106 supported on first and second conveyors 44 and 48, respectively.

Figures 14, 15:
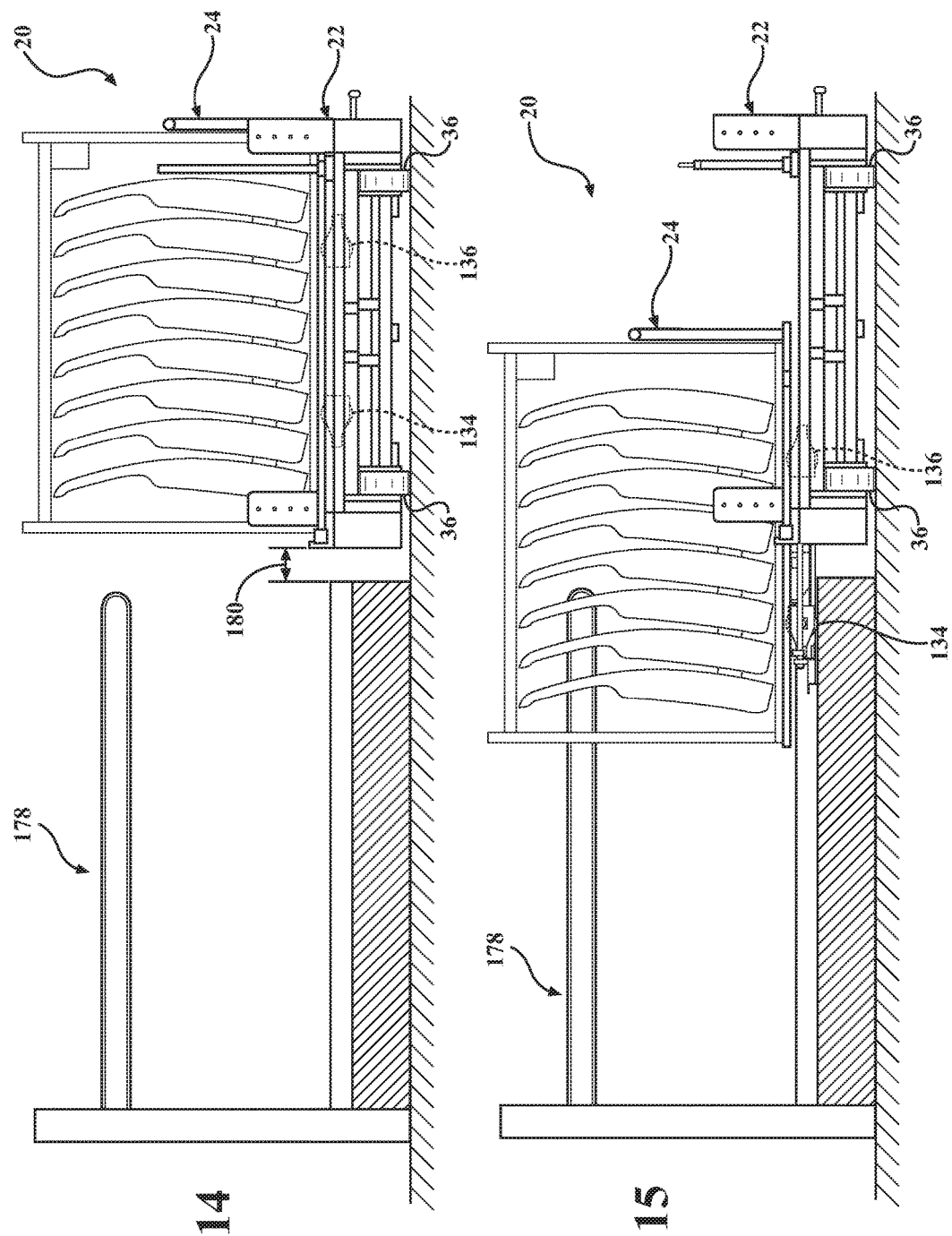
FIG. 14 is a side elevational view of the cargo transport system positioned adjacent a conveyor system.
FIG. 15 is a side elevational view of the cargo transport system with the cassette being unloaded from the dolly to the conveyor system.

With reference to FIGS. 8, 9, 14 and 15, first and second drive wheels 134 and 136 may be spaced apart a distance 176 along axis 138. The spacing, along with both first and second drive wheels 134 and 136 being driven, enables cassette 24 to traverse gaps in traction surface 172 without first and second drive wheels 134 and 136 losing traction. This may occur, for example, when loading and/or unloading cassette 24 from dolly 22. For example, FIGS. 14 and 15 illustrate cassette 24 being unloaded from dolly 22 onto a conveyor system 178. With cassette 24 entirely positioned on dolly 22 both first and second drive wheels 134 and 136 are in contact with track plate 174 on dolly 22. To unload cassette 24 from dolly 22 and onto conveyor system 178, an operator may activate first and second motors 146 and 148 to cause the respective first and second drive wheels 134 and 136 to rotate and move cassette 24 toward conveyor system 178. Initially both first and second drive wheels 134 and 136 contact track plate 174, but first drive wheel 134 will lose contact with track plate 174 as first drive wheel 134 crosses a gap 180 between dolly 22 and conveyor system 178. Second drive wheel 136 will continue to propel cassette 24 toward conveyor system 178 as first drive wheel 134 traverses gap 180. First drive wheel 134 may reestablish traction once it spans gap 180 and establishes contact with conveyor system 178. Second drive wheel 136 will similarly lose traction as it spans gap 180, during which first drive wheel 134 will continue propelling cassette 24 toward conveyor system 178. The inline arrangement of first and second drive wheels 134 and 136 enables cassette 24 to propel itself along surfaces that may include various discontinuities that could cause a loss to traction if a single drive wheel 132 where employed.

Pivotally connecting the first and second drive wheels 134 and 136 to drivetrain frame 120 (which in turn is rigidly connected to base frame 96) enables the first and second drive wheels drive wheels 134 and 136 to maintain continuous contact with traction surface 172 as cassette 24 traverses an uneven traction surface 172. Pivotally connecting first and second drive wheels 134 and 136 to drivetrain frame 120 enables drivetrain 118 to continuously adjust a location of first drive wheel 134 axis of rotation 140 and second drive wheel 136 axis of rotation 142 relative to first and second conveyor rails 104 and 106 as cassette 24 travels across an uneven traction surface 172. Biasing members 170 provide a continuous biasing force that urges first and second drive wheels 134 and 136 into contact with traction surface 172.

Figure 13:
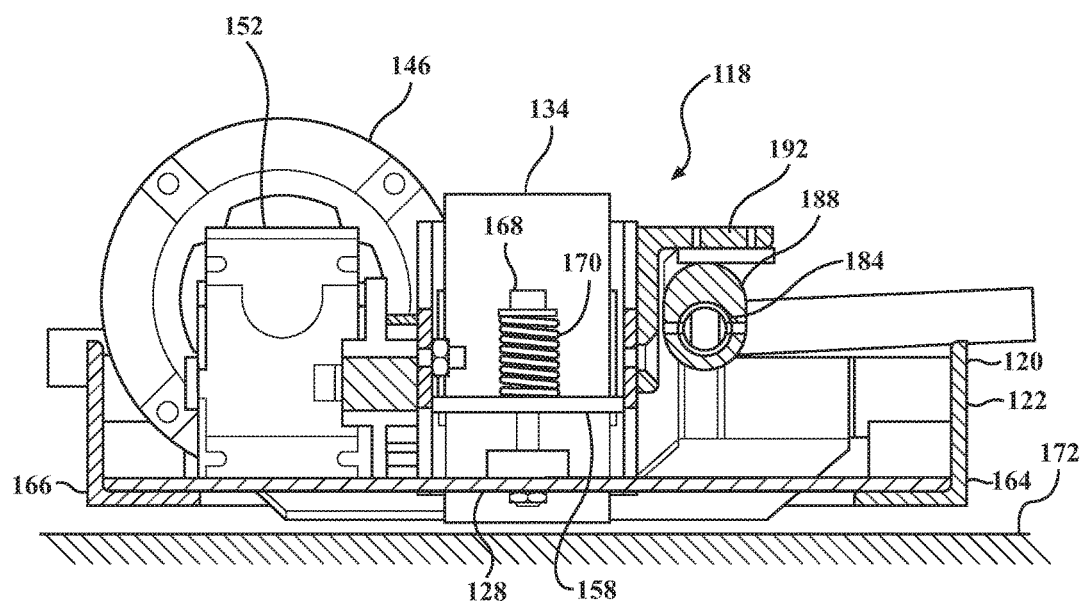
FIG. 13 is a partial cross-sectional view of the drivetrain taken along section line 13-13 of FIG. 8, with the first drive wheel arranged in a retracted position.

With reference to FIGS. 8, 9 and 11-13, drivetrain 118 may include a drive wheel retractor 182 operable for selectively moving first and second drive wheels 134 and 136 between a traction position, as illustrated, for example, in FIGS. 9 and 11, and a raised position, as illustrated, for example, in FIGS. 12 and 13. First and second drive wheels 134 and 136 are disengaged from traction surface 172, such as track plate 174 on dolly 22, when drive wheel retractor 182 is arranged in the raised position. The entire weight of cassette 24 and any cargo loaded on the cassette 24 is supported entirely by first and second conveyor rails 104 and 106 when drive wheel retractor 182 is arranged in the raised position. The weight of cassette 24 and any loaded cargo is distributed between first and second conveyor rails 104 and 106, and first and second drive wheels 134 and 136, when drive wheel retractor 182 is arranged in the traction position.

Drive wheel retractor 182 may include an elongated actuator shaft 184 that extends from first drive wheel 134 to second drive wheel 136. Actuator shaft 184 may be rotatably connected to drivetrain frame 120. A handle 186 for rotating actuator shaft 184 about its longitudinal axis may be connected to an end of actuator shaft 184. A first cam 188 may be connected to actuator shaft 184 adjacent first drive wheel 134 and a second cam 190 may be connected to actuator shaft 184 adjacent second drive wheel 136. First cam 188 may engage a first cam bracket 192 attached to first pivot arm 158. Second cam 190 may engage a second cam bracket 194 attached to second pivot arm 160.

Drive wheel retractor 182 may be moved from the traction position (as illustrated, for example, in FIGS. 9 and 11) to the raised position (as illustrated, for example, in FIGS. 12 and 13), by rotating handle 186 counter-clockwise (as viewed from the perspective of FIGS. 11 and 13). This causes first cam 188 to press against first cam bracket 192 to pivot first pivot arm 158 clockwise (as viewed from the perspective of FIGS. 9 and 12) about pivot shaft 162, and second cam 190 to press against second cam bracket 194 to pivot second pivot arm 160 counter-clockwise (as viewed from the perspective of FIGS. 9 and 12), thereby raising first and second drive wheels 134 and 136 to disengage them from traction surface 172. First and second drive wheels 134 and 136 may be engaged with traction surface 172 by reversing the process and rotating handle 186 clockwise to move drive wheel retractor 182 from the raised position to the traction position.

It is intended that the scope of the present methods and apparatuses be defined by the following claims. However, it must be understood that the disclosed systems and methods may be practiced otherwise than is specifically explained and illustrated without departing from its spirit or scope. It should be understood by those skilled in the art that various alternatives to the configurations described herein may be employed in practicing the claims without departing from the spirit and scope as defined in the following claims. The scope of the disclosed systems and methods should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future examples. Furthermore, all terms used in the claims are intended to be given their broadest reasonable constructions and their ordinary meanings as understood by those skilled in the art unless an explicit indication to the contrary is made herein. In particular, use of the singular articles such as "a," "the," "said," etc., should be read to recite one or more of the indicated elements unless a claim recites an explicit limitation to the contrary. It is intended that the following claims define the scope of the device and that the method and apparatus within the scope of these claims and their equivalents be covered thereby. In sum, it should be understood that the device is capable of modification and variation and is limited only by the following claims.

What is claimed is:

1. A cargo transport system comprising:
    a dolly comprising:
        a dolly frame;
        at least one dolly wheel attached to the dolly frame for supporting the dolly on a surface; and
        a track plate attached to the dolly frame; and
    a cassette moveably mountable on the dolly for transporting a workpiece, the cassette comprising:
        a cassette frame including a first cassette conveyor engagable with the dolly for moveably supporting the cassette on the dolly and a second cassette conveyor spaced from the first cassette conveyor and engagable with the dolly for moveably supporting the cassette on the dolly; and
        a first drive wheel attached to the cassette frame between the first and second cassette conveyors, the first drive wheel rotatable about a first axis of rotation and operable for moving the cassette along a path-of-travel relative to the dolly, wherein a location of the first axis of rotation is continuously adjustable relative to at least one of the first and second cassette conveyors for traction with the dolly as the cassette moves along the path-of-travel.

2. The cargo transport system of claim 1 further comprising a second drive wheel spaced from the first drive wheel along the path-of-travel and attached to the cassette frame between the first and second cassette conveyors, the second drive wheel rotatable about a second axis of rotation and operable for moving the cassette along the path-of-travel relative to the dolly, wherein a location of the second axis of rotation is continuously adjustable relative to at least one of the first and second cassette conveyors for traction with the dolly when moving the cassette along the path-of-travel.

3. The cargo transport system of claim 2, wherein the first and second drive wheels are located along a common plane aligned substantially perpendicular to the first and second axes of rotation and parallel to the path-of-travel.

4. The cargo transport system of claim 3 further comprising:
    a first biasing mechanism having one end connected to the cassette frame and a second end connected to the first drive wheel, the first biasing mechanism operable for urging the first drive wheel into contact with the track plate when the cassette is moved along the path-of-travel; and a second biasing mechanism having one end connected to the cassette frame and a second end connected to the second drive wheel, the second biasing mechanism operable for urging the second drive wheel into contact with the track plate when the cassette is moved along the path-of-travel.

5. The cargo transport system of claim 1 further comprising a first biasing mechanism having one end connected to the cassette frame and a second end connected to the first drive wheel, the first biasing mechanism operable for generating a biasing force urging the first drive wheel into contact with the track plate when moving the cassette along the path-of-travel.

6. The cargo transport system of claim 1, wherein the dolly further comprises a first dolly conveyor engagable with the first cassette conveyor and a second dolly conveyor engagable with the second cassette conveyor, wherein the first and second dolly conveyors include a plurality of rollers, each having an axis of rotation aligned substantially perpendicular to the path-of-travel, and the first and second cassette conveyors each include an elongated cassette conveyor rail engagable with and moveably supported on the plurality of rollers.

7. A cargo transport system comprising:
a dolly comprising:
  a dolly frame;
  at least one dolly wheel attached to the dolly frame for supporting the dolly on a surface;
  a track plate attached to the dolly frame;
  a first dolly conveyor attached to the dolly frame; and
  a second dolly conveyor attached to the dolly frame and spaced from the first dolly conveyor, the track plated located between the first and second dolly conveyors; and
a cassette moveably mountable on the dolly for transporting a workpiece, the cassette comprising:
  a cassette frame including a first cassette conveyor engagable with the first dolly conveyor and a second cassette conveyor spaced from the first cassette conveyor and engagable with the second dolly conveyor, the first and second cassette conveyors operable in conjunction with the first and second dolly conveyors for supporting the cassette on the dolly;
  a first drive wheel movably attached to the cassette frame between the first and second cassette conveyors, the first drive wheel rotatable about a first axis of rotation and operable for moving the cassette along a path-of-travel relative to the dolly; and
  a first biasing mechanism having one end connected to the cassette frame and a second end connected to the first drive wheel, the first biasing mechanism operable for generating a first biasing force urging the first drive wheel into contact with the track plate.

8. The cargo transport system of claim 7 further comprising a second drive wheel spaced from the first drive wheel and movably attached to the cassette frame between the first and second cassette conveyors, the second drive wheel rotatable about a second axis of rotation and operable for moving the cassette along the path-of-travel.

9. The cargo transport system of claim 8, wherein the first and second drive wheels are located along a common plane aligned substantially perpendicular to the first and second axes of rotation and parallel to the path-of-travel.

10. The cargo transport system of claim 8 further comprising a second biasing mechanism having one end connected to the cassette frame and a second end connected to the second drive wheel, the second biasing mechanism operable for generating a second biasing force urging the second drive wheel into contact with the track plate.

11. The cargo transport system of claim 10, wherein a sum of a magnitude of the first biasing force and a magnitude of the second biasing force is less than a weight of the cassette.

12. The cargo transport system of claim 7, wherein the first and second dolly conveyors include a plurality of rollers, each having an axis of rotation aligned substantially perpendicular to the path-of-travel, and the first and second cassette conveyors each include an elongated cassette conveyor rail engagable with and moveably supported on the plurality of rollers.

13. The cargo transport system of claim 12, wherein longitudinal axes of the cassette conveyor rails are aligned substantially parallel to the path-of-travel.

14. The cargo transport system of claim 7, wherein a magnitude of the first biasing force is less than a weight of the cassette.

15. The cargo transport system of claim 7, wherein the first drive wheel is pivotally connected to the cassette frame.

16. The cargo transport system of claim 7 further comprising a motor operably connected to the first drive wheel for rotating the first drive wheel about the first axis of rotation, the first drive wheel and the motor pivotally mounted on the cassette frame as a combination for concurrent pivoting movement.

17. A self-propelled pallet comprising:
a frame including a first conveyor engagable with a surface on which the pallet is supported and a second conveyor spaced from the first conveyor and engagable with the surface;
a first drive wheel attached to the frame between the first and second conveyors, the first drive wheel rotatable about a first axis of rotation and operable for moving the pallet along a path-of-travel, wherein a location of the first axis of rotation is continuously adjustable relative to at least one of the first and second conveyors as the pallet moves along the path-of-travel; and
a first biasing mechanism having one end connected to the frame and a second end connected to the first drive wheel, the first biasing mechanism operable for generating a biasing force urging the first drive wheel into contact with the surface when moving the pallet along the path-of-travel.

18. The self-propelled pallet of claim 17 further comprising:
a second drive wheel attached to the frame between the first and second conveyors and spaced from the first drive wheel along the path-of-travel, the second drive wheel rotatable about a second axis of rotation and operable for moving the pallet along the path-of-travel, wherein a location of the second axis of rotation is continuously adjustable relative to at least one of the first and second conveyors when moving the pallet along the path-of-travel; and
a second biasing mechanism having one end connected to the frame and a second end connected to the second drive wheel, the second biasing mechanism operable for urging the second drive wheel into contact with the surface when the pallet is moved along the path-of-travel.

19. The self-propelled pallet of claim 17, wherein the first drive wheel is pivotally connected to the frame.

20. The self-propelled pallet of claim 17 further comprising a motor operably connected to the first drive wheel for rotatably driving the first drive wheel, the first drive wheel and the motor pivotally mounted on the frame as a combination for concurrent pivoting movement.

\* \* \* \* \*